United States Patent [19]

Hirakawa et al.

[11] Patent Number: 4,904,485

[45] Date of Patent: Feb. 27, 1990

[54] FAT COMPOSITIONS SUITABLE FOR USE IN BAKERIES OR CONFECTIONERIES

[75] Inventors: Tamotsu Hirakawa, Takasago; Kozo Oya, Kakogawa; Minoru Ueda, Kobe; Hiroaki Yamauchi, Kakogawa, all of Japan

[73] Assignee: Kanegafuchi Kagaku Kogyo Kabushiki Kaisha, Osaka, Japan

[21] Appl. No.: 104,712

[22] Filed: Oct. 1, 1987

[30] Foreign Application Priority Data

| Oct. 2, 1986 | [JP] | Japan | 61-234783 |
| Aug. 3, 1987 | [JP] | Japan | 61-194195 |
| Aug. 13, 1987 | [JP] | Japan | 61-202226 |

[51] Int. Cl.$^4$ .................................................. A23L 1/28
[52] U.S. Cl. .......................................... 426/62; 426/96; 426/98; 426/99; 426/519; 426/555; 426/601; 426/602; 426/603; 426/604
[58] Field of Search .................. 426/602, 62, 603, 96, 426/601, 604, 58, 98, 99, 519

[56] References Cited

U.S. PATENT DOCUMENTS

| 3,582,362 | 6/1971 | Drews et al. | 426/602 |
| 3,679,430 | 7/1973 | Birnbaum | 426/602 |
| 3,995,066 | 11/1976 | Muys et al. | 426/603 |
| 4,252,836 | 2/1981 | Akin et al. | 426/602 |
| 4,477,478 | 10/1984 | Tiberio et al. | 426/602 |
| 4,536,407 | 8/1985 | Shay | 426/602 |

*Primary Examiner*—Peter Chin
*Attorney, Agent, or Firm*—Armstrong, Nikaido, Marmelstein, Kubovcik, and Murray

[57] ABSTRACT

A fat composition suitable for use in bakery or in confectionery, comprising
(a) an aqueous phase containing a disrupted yeast cells suspension or a wheat flour suspension treated with either a disrupted yeast cells suspension or a mixture of a disrupted yeast cells suspension and an yeast
(b) a fat component and
(c) an emulsifier, a bakery or confectionary product produced by using the fat composition and processes for preparing them. The composition can be prepared in large quantities and has a good preservation stability, and thereby becomes more excellent for producing in industrial scale the bakery and confectionary product, which has a good color and nature of crust, grain of crum, aroma and taste, and in accordance with the process, it can prepare the product easily and simply.

18 Claims, 3 Drawing Sheets

△——△ Total Reducing Power of the Composition
▲——▲ GSH Concentration of the Composition
○——○ Total Reducing Power of the Autolysate
●——● GSH Concentration of the Autolysate (1) ×———× Yeast Autolysate
(2) ⊗———⊗ Autolysate and 1g/dℓ Flour
(3) o-----o Potassium Periodate
(4) △-----△ Sodium Hydrosulfite
(5) ⊙———⊙ Control (1) ○----○ Compressed Baker's Yeast
(2) ●——● Yeast Autolysate
(3) ⊙——⊙ Baker's Yeast and Yeast Autolysate

FAT COMPOSITIONS SUITABLE FOR USE IN BAKERIES OR CONFECTIONERIES

BACKGROUND OF THE INVENTION

The present invention relates to a fat composition suitable for use in a bakery or confectionery, a bakery or confectionary product produced by using the composition and a process for preparing them. More particularly, it relates to the composition, which exerts a function of better dough improvers meeting its uses, prepared by composing a suspension, which is obtained by reacting either active substances having a function of dough improvers derived from an yeast or a mixture of an yeast and the active substances with a wheat flour, into fat. The term "fat" is used herein to include both the fatty acid triglycerides which are solid at about 20° C. and triglycerides which are liquid at that temperature and which are commonly described as "oils".

A fat composition, e.g. margarine or shortening, is an important sub-material which is variously used for the preparation of dough for bakeries or confectioneries. It is known that as to a function of the fat composition, it plays very important parts such as an improvement of the extensibility of dough, an increase of a bread loaf-volume by elevating the gas retention ability in dough, a bestowal of the tolerance to mechanical treatment on dough and a retardation of the product staling.

On the other hand, an yeast is also considered to be an important sub-material, as well as a fat composition, for the preparation of bakeries or confectioneries. As the functions of the yeast for the preparation of bakeries, it is known that it exerts three functions such as a gas evolution, an activation of a dough development and a flavors formation in the course of a dough maturation processes.

The aim of the present invention is that both of the function derived from the yeast and the function of fat are combined to elevate the each peculiar function thereof synergyly and thereby to exert the functions stably.

Though, as mentioned above, it is known that fat and the yeast play a very important role for the properties of dough and the quality of a product, there are still a lot of unsolved parts as to mechanisms concerning with the dough maturation processes, e.g. the dough development and the flavors formation, in spite of many studies. For example, as to the function of fats for a dough, there are some hypotheses: the improvement of the extensibility of dough and the elevation of the gas retention ability in dough will be caused by an extention of fats along a film of gluten; the elevation of the gas retention ability will be caused by binding a lipid, which is contained in a wheat flour, with the fat composition the elevation of a function of dough improvers based on fats will be caused by the interaction between fats and gluten.

As for the function of an yeast, the mechanism of the gas evolution ability is clearly known in detail, in the meantime, there remains a lot of unknown parts as to the mechanisms of the dough development, the flavors formation and so on. There are still suggested some posibilities, e.g. an activation of the dough development through metabolites, e.g. organic acids, esters or alcohols such as ethanol and an action of a reducing substances such as glutathione and cysteine or enzymes such as protease, phospholipase, invertase and maltase leaked out from an yeast cells.

The properties, which are required for a dough, such as the extensibility of dough, the tolerance to mechanical treatment and the gas retention ability are presumed to be concerned with a phenomenon of a network-forming caused by each of a dissociation (depolymerization) and a reassociation of gluten protein, and studied based on the presumption. Among substances derived from the yeast, reduced type glutathione is know to improve the extensibility of dough by either cutting the -SS- bond of gluten or depolymerizing a protein molecule through an activation of protease and it is tried to apply glutathione as a dough-improving agent for the preparation of bakeries or confectioneries. However, glutathione is expensive, therefore it is not suitable to use it on an industrial scale.

So, a disrupted yeast, which is presumed to contain glutathione, in stead of using glutathione itself, has been also employed to apply to the process for the preparation of bakeries so far.

However, both the reduced type glutathione and the disrupted yeast cells have such some disadvantages that it is very unstable since it is easily oxidized by air or decomposed by contaminants and that it is difficult to use for the preparation of bakeries since the action thereof is very rapid and it's exess-use often causes a damage on the dough.

As for substances, which are capable of advancing the dough maturation by acting on gluten contained in the wheat flour and derived from the yeast, except for glutathione, there are, as mentioned above, substances such as organic acids, alcohols and esters, which are accumulated during the dough maturation by the action of the yeast or lactic acid bacteria, and enzymes such as protease, which are able to be secreted from the yeast or lactic acid bacteria. These substances are supposed to advance the dough maturation complexly acting with the reducing substances. In this case, it should be pointed out that the substance, capable of concerning with the dough maturation, such as the reduced type glutathione and protease usually exist inside of the yeast cells and that the appearance of the enzyme activity thereof is also prevented by inhibitors, which exist inside of the yeast cells, and so on.

Therefore, it is expected to make the above mentioned substances, which are leaked out from the cells by disrupting the yeast cells, activated in order to give the more effective activities. Provided that the those active substances outside of the cells are very unstable as mentioned above, it is impossible to obtain a stable effect if protecting the substance is not considered.

Consequently, the present inventors tried to prepare a composition by emulsifying the disrupted yeast cells suspension into fats in order to protect the activities.

As a result of a test of the above mentioned try, expecting to obtain complex effects of effects such as a masking effect based on fats and an effect as an antioxidizing agent generally existed in a natural fats, expectedly, there are found a preferable preservation stability effect and, in the case of using the obtained composition for the preparation of a dough, the dough improvers effect being more effective than that in the case of using the disrupted yeast cells suspension without emulsifying it into the fats.

As a result of further study, the present invention is accomplished by finding that by producing a composition, which is prepared by reacting either the disrupted yeast cells suspension or the mixture of the disrupted yeast cells suspension and the yeast with the wheat flour, followed by emulsifying the resulting mixture into fats synergistic improved effects such as the extensibility of dough, the tolerance to mechanical treatment, the gas retention ability, the improvement of grain of crum structure and the advancement of flavors formation can be obtained by using the above obtained composition as a dough for the preparation of bakeries or confectioneries.

It is an object of the present invention to provide a fat composition for the preparation of bakeries or confectioneries, the composition being endowed with a function of dough improvers.

A further object of the present invention is to provide a method comprises advancing the stability of dough maturation by elevating the functions which are endowed by nature with the wheat flour, which is the main material of dough, the yeast and fats, which is a sub-material of dough, and thereby developing the interactions with one another beforehand.

A still further object of the present invention is to provide a method which stably maintains the activity of dough improvers derived from the yeast cells by emulsifying either into fats or by drying the emulsified fat composition to form a composition in the form of powder and thereby stably exerts the dough improvers effect for the preparation of bakeries or confectioneries.

Another object of the present invention is to provide a method which improves the properties of dough by means of the modifications, e.g. depolymerization by a reducing power, of gluten contained in the wheat flour by the activity derived from the yeast cells and thereby develops the interaction of gluten with fats.

Consequently, the present invention, according to the above objects, provides a method for preparing the products such as bakeries or confectioneries having stable qualities as well as a method useful to a rationalization such as a shortening of processes.

SUMMARY OF THE INVENTION

In accordance with the present invention, there is provided a fat composition suitable for use in bakery or in confectionery, comprising (a) an aqueous phase containing a disrupted yeast cells suspension or a wheat flour suspension treated with either a disrupted yeast cells suspension or a mixture of a disrupted yeast cells suspension and an yeast.

(b) a fat component and (c) an emulsifier, a bakery or confectionary product produced by using the fat composition and processes for preparing them.

The composition of the present invention can be prepared in large quantities and have a good preservation stability, and thereby becomes more excellent for producing in an industrial scale the bakery and confectionary product, which has a good color and nature of crust, grain crum, aroma and taste. The processes can be prepared them easily and simply.

DETAILED DESCRIPTION

Figure 1:
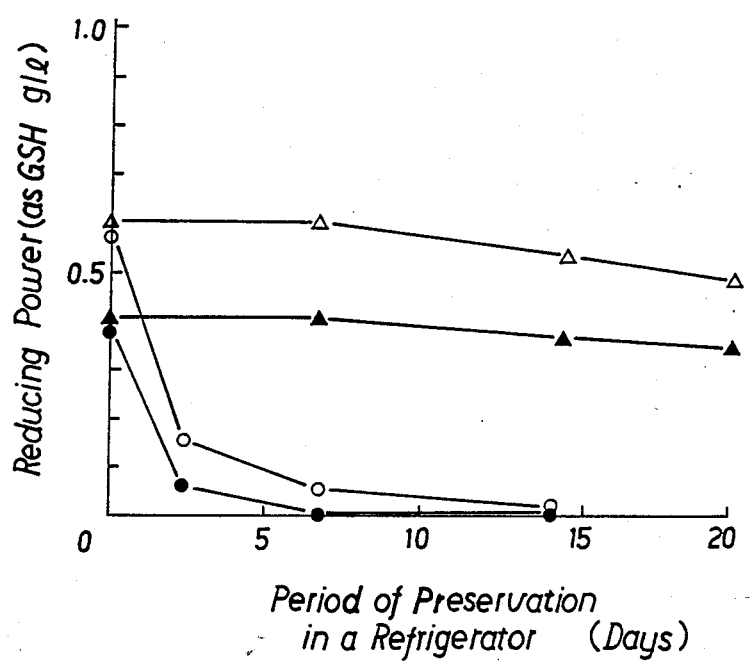
FIG. 1 is a graph showing the change of the reducing power of an aqueous phase of the composition into which an yeast autolysate is emulsified, when preserved in a refrigerator.

Hereinafter, the present invention is explained in detail.

A fat composition of the present invention is obtained by preparing a composition, which contains 1 to 50 parts by weight of an aqueous phase, 50 to 99 parts by weight of a fat component and 0.1 to 5.0 parts by weight of an emulsifier.

Aqueous phase in the present invention is a liquid containing as basic components, a disrupted yeast cells suspension or a wheat flour treated with either a disrupted yeast cells suspension or a mixture of a disrupted yeast cells suspension and an yeast.

As for the yeast in the present invention, there are provided yeasts belonging to Saccharomyces genus, e.g. baker's yeast or brewery's yeasts such as beer yeast and wine yeast, yeasts belonging to Kluyveromyces genus, which are used for fermentation of lactic products such as Cheese whey or yeasts belonging to Candida genus used for food.

Among them, a baker's yeast is the most suitable one. However, there differ enzyme activities, oxidizing or reducing power, flavoring precursors and so on according to the kind of yeast cells adopted and it is possible to use the combination of two and more yeasts according to an object. Also, compressed yeasts or dried yeasts, each of which is comercially available, may be used.

An yeast cells suspension is prepared first of all, a concentration thereof has the solid content, dried yeast base, of 1 to 20 % by weight. The yeast concentration can be chosen based on a lebel of a reducing power necessary for the dough improvers effect of a disrupted yeast cells suspension. For example, in case of biscuit dough, which requires to get the extensibility of dough in a short time, the yeast concentration is adjusted at a higher level, e.g. the solid content of 3 to 15 % by weight, and in case of bread dough, whose fermentation time is comparatively long and which requires the tolerance to machanical treatment both (the extensibility and elasticity of dough are seemed to be concerned with it) as well as the gas retention ability, the yeast concentration is adjusted at a comparatively lower level, e.g. the solid content of 1 to 6 % by weight.

As for a method of disrupting the yeast cells, methods of advancing autolysis are generally used. For example, there are provided a method of stirring the yeast cells suspension at pH of 4 to 6 and at temperatures ranging from 40° to 45° C. and a method of stirring the yeast cells suspension, to which is added ethyl acetate in an amount of 0.5 to 5.0 % by volume of the yeast cells suspension, at pH of 4.0 to 6.0 and at temperatures ranging from 20° to 45° C. A physical methods such as a ultrasonic wave treatment ar available too.

There is another method of heating the yeast cells suspension at temperatures ranging from 60° to 95° C. for a short time, e.g. for 2 to 15 minutes. In this case, the enzyme activities are almost inactivated, but the dough maturation activating factors such as a reducing substance are leaked outside of the yeast cells. Therefore, they are effectively used.

The obtained disrupted yeast cells suspension may be instantly used for the preparation of a fat composition of the present invention, meantime it is possible to elevate the protease activity by preserving it at pH of 4.5 to 5.5 for one day to three days.

As mentioned above, the composition may be prepared by using the disrupted yeast cells suspension, which is actively treated.

Also, the composition may be prepared after the reaction of either the disrupted yeast cells suspension or a mixture of the disrupted yeast cells suspension and the yeast cells with a wheat flour in order to elevate the dough improvers effect. For example, there is provided a method of stirring the disrupted yeast cells suspension, to which is added a wheat flour in an amount of 0.5 to 20% by weight of the suspension, at pH of 4.0 to 6.0 at a temperature of 20° to 50° C. for about 0.5 to 2 hours.

Another method comprises mixing both the yeast cells suspension of 1 to 20% by dry weight base and the wheat flour in an amount of 1 to 20% by weight of the suspension homogeneously and then subjecting the mixture to an incubation at pH ranging from 4.0 to 6.0 with stirring. The incubation time is for 2 to 4 hours at 30° C., and if the temperature is below 25° C., it may take more than 4 hours. According to the incubation between the wheat flour and the yeast cells, the fermentation, which is based on the yeast by making the most of the wheat flour component, is developed and thereby the reaction similar to dough maturation is advanced.

In the above case, lactic acid bacteria may be added. According to this addition of lactic acid bacteria, the effect of both advancement of dough maturation and the flavor improvement can be expected.

As for lactic acid bacteria, starters for the fermentation of lactic acid can be used. The starters are belonged to genuses such as Lactobacillus genus, Streptococcus genus, Pediococcus genus and Leuconostoc genus.

After the incubation, yeast autolysis is employed in order to advance the reaction. As for the methods of autolysis, among the above mentioned, the method of using ethyl acetate is simple and able to prepare the composition having the high dough improvers effect.

Ethyl acetate is supposed to effectively develop in case of preparing the composition, the effect of the interaction between fats and gluten by acting on gluten included in the wheat flour, as well as the yeast autolysis effect. That is to say, in the present invention, after autolysis by using ethyl acetate, ethyl acetate is distilled under vacuum to be evaporated, but ethyl acetate usually remains in an amount of 50 to 500 ppm in an autolysate and thereby it is speculated that the residual will take the above mentioned additional effect.

As for the fat component of the present invention, an animal or vegetable fat is used, which is a member selected from the group consisting of soybean oil, cotton seed oil, rapeseed oil, palm oil, coconut oil, corn oil, palm karnel oil, jojoba oil, cuphea oil, fish oil, beef tallow and cream, a hydrogenated fat thereof, a fractionated fat thereof and an interesterified fat thereof.

In case of using an animal fat as a material, the preservation stability of the activity in an aqueous phase may be advanced by mixing it with a vegetable fat containing a natural antioxidizing agent. Also, a natural antioxidizing agents such as tocopherol are useful for the above effect, the amount thereof is generally determined according to the amount, as one of indexes, which is added to margarine, i.e. 0.01 to 0.05% by weight of margarine. It is preferable to use a fat having a melting point of 20° to 45° C. for easily kneading thereof. And the melting point is able to be regulated by the kind of the used fat and by controlling the hydrogenation level thereof.

As for an emulsifier, it is not particularly limited. Examples of the emulsifier are, for instance, fatty acid esters of glycerol, propylene glycol, polyglycerol, sucrose or sorbitan and lecithin. The amount thereof varies ranging from 0.1 to 5.0% by weight of the composition.

As for the preparation of the composition, the composition is obtained by mixing and stirring an aqueous phase, at a temperature at which the fat component is liquid aqueous phase, fat component and an emulsifier to form a preliminary emulsion, rapidly chilling and kneading the emulsion for plasticization.

Examples of the apparatuses used in the present invention are, for instance, votator, perfector, onrator, kombinator and complector.

Another preparation is available to form the composition, e.g. "After-Mixing method", which comprises kneading the usually used fat compositions such as margarine with aqueous phase in the present invention. That is to say, for example, there are put margarine as fat composition in the form of emulsion and an aqueous phase in the present invention, in an amount of 1 to 35 parts by weight of margarine, to the mixer and stirred at temperatures ranging from 30° to 40° C. to form a reemulsion, followed by chilling the mixture to give the composition. In this case, an emulsifier may be added thereto, if necessary. But, usually, the emulsifier, which is used in the process for preparing margarine, is enough to be used in the above process and the addition of the emulsifier is not necessary. When the effect of enzyme activity for dough, in addition to the reducing power, is also expected, the above mentioned "After-Mixing method" may be easily employed at temperatures ranging from 25° to 40° C. for the preparation of the composition.

The plasticized composition is preferable to be preserved below 10° C. As for the preparation of the composition being good in preservation stability, there is provided a method for the preparation of the fat composition in the form of powder. There are reported many kinds of the methods for the preparation of the pulverized composition and a typical example thereof is a spray-dry method; the pulverized composition is obtained by adding an additive to aqueous phase, mixing the fat component and the emulsifier therewith, stirring the mixture to form an emulsion, and homogenizing and spray-drying the emulsion. The additive serves as a coating or stabilizing agent. Examples of the additive are, for instance, a member selected from the group consisting of proteins or protein-containing materials such as wheat protein, casein, soy protein, non-fat dry milk, egg white albumin and gelatin, carbohydorates such as starch or derivative thereof, dextrin, maltose, and lactose, gums such as gum arabic, guar gum, carrageenan, xanthan gum and cellurose derivatives.

As to aqueous phase of the present invention, there is preferably used a disrupted yeast cells suspension or a wheat flour suspension treated with either a disrupted yeast cells suspension or a mixture of a disrupted yeast cells suspension and an yeast.

The pulverized composition is good in preservation stability. That is to say, there are some advantages such as an easy mixing and a simple treatment as well as a possible preservation at a room temperature.

As for fat component available for the preparation of the pulverized composition, it is preferable to use hydrogenated fats of vegetable fat such as corn oil, cotton oil, coconut oil, palm oil and soybean oil.

The prepared composition, as mentioned above, is able to be preserved at least for one month, if preserved at below 10° C. During the preservation, the whole reducing power of the composition is maintained 70 to 80% and more of that contained at the time of preparation thereof, the protease activity is suitably increased, moreover, the flavor thereof is not lost. Therefore, it is possible to provide the composition to use as dough for the preparation of bakeries or confectioneries, optionally, during this period. The amount of the composition may be decided according to each standard properties, such as the whole reducing power and the protease activity, at the time of using it.

Thus, the composition of the present invention can be prepared in large quantities and be preserved, without preparing the yeast autolysate, which is not good in preservation stability, every time it is used, and thereby becomes more excellent for producing in industrial scale.

In case of using the composition of the present invention for the preparation of bakeries, they are substituted for a part or whole amount of usually used fat composition such as shortening and margarine.

That is to say, in the preparation of bakeries, bakeries are usually obtained by preparing a dough by means of mixing both, as a main material, a wheat flour and, as a sub-material, saccharides such as sugar and isomerized glucose syrup, a salt, dairy products such as non-fat dry milk, egges or derivatives thereof, baker's yeast, yeast foods, flavoring agents and fat compositions and so on with water, dough maturation or fermentation and expanding dough by using the fermentation ability of baker's yeast, followed by baking dough. There is another method which expands dough by using a leavening agent instead of baker's yeast and also is available for the preparation of bakeries.

The amount of the above mentioned fat composition, which is a sub-material for the preparation of bakeries, is different from the kind of bakeries. For example, the amount of fat composition in English bread varies ranging from 1 to 3% by weight of wheat flour; that in white bread varies from 3 to 7%; that in sweet dough bread ranges from 3 to 20%. The part or whole amount of fat compositions is substituted by the composition of the present invention.

On the other hand, the amount of the composition of the present invention is not limited, but as one of indexes, the composition having a reducing power of 0.02 to 1.0 ml of $10^{-3}$ M $KIO_3$ per one ml of the aqueous phase is used so that the amount of the yeast contained composition varies ranging from about 0.01 to 0.3% by dry weight base of the wheat flour.

Since the optimum amount varies according to the amount of an oxidizing agents, which are added to dough, such as bromate and ascorbic acid, it is decided according to the results obtained by a reological evaluation test of dough, a bread baking test and so on.

Baked confectioneries such as biscuits and crackers are obtained by preparing dough, which comprises mixing both a wheat flour as a main material, and as sub-materials, saccharides such as sugar and isomerized glucose syrup, salt, dairy products such as non-fat dry milk, a liquid or dry egg, an yeast or leavening agent, a flavoring agent, a fat composition and so on, with water, subjecting the dough to a maturation or fermentation process, which may be canceled, folding the dough by means of a laminator, rolling in the dough in sheets by a sheeter and a rolling machine and cutting it, followed by baking the obtained dough.

As for cracker, it is obtained by mixing the sponge, which has been fermented by using the yeast for about 18 hours, with materials for dough mixing, fermenting another for 3 to 5 hours, folding the dough by means of a laminator and cutting it, followed by baking the obtained dough. In this case, fat composition is added as a material for dough mixing and also it is possible to ferment dough either by using the sponge dough, which contains the composition of the present invention in an amount of 0.5 to 2.0% by weight of the sponge dough, or by substituted the composition for a part or whole of fats and oils for dough mixing.

The used amount of fat compositions are different from the kinds of confectioneries, but it varies ranging from 5 to 50% by weight of wheat flour.

As mentioned above, in case of using the composition as dough for baked confectioneries such as biscuit and cracker, the method by using the composition as dough for bakeries may be employed. However, in case of dough for confectioneries, it requires, in many cases, the extensibility of dough and the shortness of the product which may be attained by controlling the formation of gluten rather than the properties of dough such as the gas retention ability by the formation of gluten, which is required in case of dough for bakeries. Therefore, it is important to operate the dough reducing power or activities such as protease, which are kept in the composition, effectively on dough and also, it is preferable to prepare the composition by elevating the reducing power or the protease activity contained in aqueous phase.

For this purpose, it is effective to add assistants to the composition, examples of the assistants are natural reducing agents such as glutathione, cysteine and ascorbic acid, protease derived from microorganism or a natural material, organic acids such as fumaric acid, succinic acid, tartaric acid, citric acid, lactic acid, malic acid, acetic acid and propionic acid. These assistants are known to have activities such as the depolymerization of protein molecule by acting to gluten protein and also applied to the composition for bakeries as well as for confectioneries.

As for the operation standard of the activity, what is called the effect of dough improvers in aqueous phase of the composition used as dough for confectioneries such as biscuit and cracker, in case of measuring by means of the Iodometric Titration Method using periodate, total reducing activity, e.i. 0.1 to 10 ml of $10^{-3}$ M $KIO_3$ solution/me, becomes one of indexes. However, in case of using the composition of the present invention, it is characterized in that it takes a preferable improving effect, even if it has a rather lower reducing activity, since it is expected, except for the reducing activity, the contribution of surface active substances to dough improves, which are produced by the association between the mixture obtained by reacting the wheat flour with the disrupted yeast cells suspension and the reacted wheat flour, e.g. depolymerized gluten protein.

The method, which uses the composition as dough for biscuit or cracker, is employed as usual, but in case of activating the active substances such as enzyme, which are included in the composition and unstable against heat, during processes for the preparation of dough, it is necessary to operate the dough temperature below 45° C., preferably 25° to 45° C. For example, in case of substituting the composition for a part of fat, there is provided the method comprises using the ordinary fat compositions such as shortening and margarine during the process, which requires a high temperature, e.g. 50° to 70° C., as to the preparation of dough, mixing the composition of the present invention with the obtained dough when the dough temperature lowers below 45° C. and thereby advancing the dough maturation.

As for biscuit dough, there are hard dough type an soft dough type and the composition of the present invention takes an excellent effect on hard dough type. Hard dough type is classified into three kinds such as fermented dough, puff dough and semi-sweet dough.

Among them, fermented dough is used for the preparation of, for example, cream crackers or soda crackers and every dough is able to be used for the preparation for straight dough process, sponge dough process and so on.

The usage of the composition of the present invention is the same as usual, but it is necessary to set up the whole amount of water used in dough by taking a ratio of aqueous phase to dough into account. Since the composition develops both the fermentation and the extensibility of dough, it is possible to prepare the product having good quality in a shorter fermentation time than usual.

As for semi-sweet dough biscuit, soft flour is usually used and fat composition is used in an amount of below 22% by weight of dough. The flour and the sub-materials are mixed and a mixing is continued to get the dough developed the same as the fermented dough. In order to obtain the enough extensibility, the intensity and time of the mixing requires twice or thrice as much as that of the fermented dough. Though reducing agents such as sodium meta-bisulfite and sodium hydrosulfite are sometimes used in order to shorten the mixing time and endow dough with the extensibility, in case of using the composition of the present invention, the above mentioned chemicals are not necessary to use and dough is endowed with the extensibility by a usual mixing and thereby products having a good crum can be obtained.

Subsequently, biscuits are obtained by subjecting the mixed dough to bench-time, folding by a laminator, pressing by a rolling machine after rolling by a dough sheeter, followed by baking the divided dough by a cutting machine.

The present invention is more specifically described and explained by means of the following Examples in which all percents and parts are by weight unless otherwise noted. It is to be understood that the present invention is not limited to the Examples, and various changes and modifications may be made in the invention without departing from the spirit and scope thereof.

EXAMPLE 1

Compressed yeast (water content: ca. 70%) of commercially available baker's yeast (*Saccharomyces cerevisiae*) was suspended in water to prepare 20 g/dl (dry base: ca. 6 g/dl) of an yeast cells suspension. To 100 ml of the suspension was added 5 ml of an aqueous solution of ethyl acetate, and the yeast autolysis was proceeded with stirring at 37° C. for 2 hours, in the range of pH 4 to 6 to give an yeast autolysate.

During the stirring, some of the autolysate was sampled at several times and centrifuged, then the absorbance of the supernatant at 260 m$\mu$ and 280 m$\mu$ was measured, each of which is corresponding to the amount of nucleic acid and protein in the supernatant, respectively. As a result of the measurement of the leakage of nucleic acid and protein caused by disruption of the yeast cells (autolysis), it was confirmed that the leakage reached its peak in 1.5 to 2 hours. Simultaneously therewith, with respect to the yeast autolysate, the amount of reduced type glutathione (GSH) was measured according to Alloxan Method, further, the total reducing power was measured according to titrimetric method with periodic acid ($KIO_3$), and the reducing power was estimated in terms of GSH.

Titrimetric method with periodic acid was employed as follows.

To a diluted of autolysate sample with water, there were added 15 ml of 2% sulfuric acid, 2 me of 5% potassium iodate solution, 2 ml of N/2 sulfosalicylic acid solution and 1 ml of 1% starch solution, and the mixture was titrated with $10^{31}$ $^3M$ $KIO_3$ solution and the end-point was determined by blue-color developing. The titer was converted into the reducing power of reduced type glutathione to indicate the total reducing power.

From the results, it was observed that the reducing power became high with the increase of the leakage of the nucleic acid and protein.

After the completely yeast-autolyzed suspension was preserved in a refrigerator overnight at pH 5.0, the residual ethyl acetate was distilled under vacuum and collected. The obtained autolysate had a total reducing power of 0.03 ml of $10^{-3}M$ $KiO_3$ per one ml of the aqueous phase, i.e., in case of estimating it by the conversion into reduced type glutathione, 0.61 g/l (as GSH) and a GSH concentration of 0.40 g/l. It was suggested that other reducing substances other than GSH were contained in the autolysate.

The activity of neutral protease (pH 6.0) in the autolysate was measured according to the following method.

A test tube (15 mm $\times$ 150 mm) was charged with 1 ml of 1.5% milk casein suspension and preheated in an incubator controlled at 37° C. In the test tube was put 1 ml of a diluted autolysate sample for measuring the enzyme activity and mixed with the suspension while shaking the test tube. Directly after that, the test tube was put into the incubator controlled at 37° C. and maintained for 60 minutes, followed by adding 2 ml of 0.4 M trichloroacetic acid thereto. Further, the test tube was maintained in the incubator of 37° C. for 25 minutes, then, the suspension was filtrated. Another test tube (30 mm $\times$ 200 mm) was charged with 1 me of the filtrate, 5 ml of 0.4M sodium carbonate and 1 ml of Folin's reagent solution diluted to a volume of 5 times and fully mixed with shaking. After maintaining the mixture in the incubator of 37° C. for 20 minutes to develop the colour, the absorbance (E) of the solution at the wavelength of 660 ml was measured.

The above procedure was repeated except that water was used instead of the sample suspension to measure the absorbance (E') as a blank. The activity of protease (unit) was calculated by multiplying the difference between the absorbance (E) and the absorbance (E') by a multiple (n) used for dilution of the autolysate sample. That is, the value was calculated acording to the following formula.

The activity of protease (unit)

$$=(E-E')\times n$$

In accordance with the above-mentioned method, the autolysate had the activity of 0.45 unit.

The obtained autolysate was employed in the preparation of the composition of the present invention as showing below.

A fat blends consisting of 55% of hydrogenated fish oil (m.p. 29° C.), 15% of hydrogenated palm oil (m.p. 30° C.), 15% of hydrogenated corn oil (m.p. 32° C.) and 15% of soybean oil was heated at 55° C. to melt. There were mixed 0.1 part of glycerol monostearate and 0.2 part of soybean lecithin as an emulsifier with 83.2 parts of the fat blends to prepare oily phase. The oily phase was preliminarily emulsified by adding 16.5 parts of the autolysate obtained in advance with stirring. The obtained preliminary emulsion was passed through a votator for rapid chilling and kneading the emulsion to give a plasticised composition. The composition was preserved in a refrigerator at a temperature ranging 5° to 10° C. The composition was sampled at several times, and each sample was melted to separate to an oily phase and an aqueous phase, and the preservation stability of the composition was examined by measuring the reducing power in the aqueous phase according to Alloxan method (GSH) and titrimetric method with periodic acid.

As a control, the change of the reducing power was measured as to the autolysate preserved in a refrigerator in the state of liquid. The results are shown in FIG. 1.

As clearly shown in FIG. 1, when the autolysate was preserved in the state of liquid, the reducing power was lowered sharply with the passage of time and vanished almost all in a week. On the other hand, the reducing power of the composition was remarkably stable and it was confirmed that 80 to 85% of the reducing power was kept even 20 days after.

EXAMPLE 2

A heating treatment of an yeast cells suspension was examined as a method for disrupting yeast cells.

The procedure of Example 1 was repeated to prepare 40 g/dl (dry base: ca. 12 g/dl) of an yeast cells suspension of baker's yeast. The suspension was subjected to a heating treatment at 85° C. for 10 minutes and filtrated.

The yeast was washed with water of the same amount as the suspension. Using the mixture of the first and second filtrate, which had a total reducing power of 0.5 g/l, a composition was prepared in the same manner as in Example 1. The obtained composition was preserved in a refrigerator at a temperature of 5° to 10° C. and the preservation stability of the reducing power was measured. As the result, it is confirmed that 85% of the reducing power of the composition was maintained during 14 days preservation. On the other hand, the reducing power was vanished in 14 days when the yeast filtrate was preserved in the state of liquid.

EXAMPLE 3

With respect to wine yeast (*Saccharomyces cerevisiae* (IAM-4274), lactic yeast (*Kluyveromyces lactis* (IFO-0433) and *Candida utilis* (IFO-0396), the preservation stability of reducing power was examined.

Employing yeast cells obtained by aerobic culture of each of above yeasts in a culture medium containing glucose as the main carbon source, an autolysate and the composition containing the autolysate were prepared and the reducing power thereof were measured with the passage of time in the same manner as in Example 1. In case the autolysates were preserved in the state of liquid, the reducing power of them were negligible after 14 days. On the other hand, the reducing power of the each of compositions containing the autolysate of yeasts, wine yeast, lactic yeast or *Candida utilis*, was maintained well, i.e. each of the compositions after 14 days preservation had the reducing power of 0.45 g/l, 0.40 g/l and 0.31 g/l (as GSH), respectively.

EXAMPLE 4

A commercially available baker's yeast (compressed yeast) was suspended in water to prepare 20 g/dl (wet base) of an yeast cells suspension, to which 1 to 5% (dry weight per the suspension) of a wheat flour (hard flour) was added with stirring, and the incubation was carried out at 30° C. for 3 hours in a pH range of 4.5 to 5.5. The pH value of the suspension was lowered during the incubation, and the more wheat flour was added, the pH value became lower. There were observed accumulation of ethanol, and at the same time, and an increase of organic acids such as succinic acid, lactic acid and acetic acid. That is, it is presumed that fermentation which was similar to dough fermentation was preceeded.

Then, the suspension was heated to 37° C., 5 ml of ethyl acetate per 100 ml of the suspension was added thereto, and it was stirred for 2 hours to proceed the autolysis of yeast cells.

During the fermentation, the liquid, in which the yeast cells were autolyzed in the presence of a wheat flour, violently foamed, and it was suggested that a surface active substances were formed. The pH was adjusted to 5.0 and after preservation for overnight, ethyl acetate was distilled and collected under vacuum at 30° C.

The obtained liquid was used for the preparation of a composition as mentioned below.

A fat blends were prepared by mixing 66.5 parts of hydrogenated fish oil (m.p. 30° C.) and 16.7 parts of corn oil at 55° C., to which 0.1 part of glycerol monostearate and 0.2 part of lecithin based on 83.2 parts of the fat blends were added. After mixing them, the mixture was emulsified by adding 16.5 parts of the liquid, which was previously obtained to the mixture, and the obtained emulsion was chilled rapidly and kneaded to give the composition.

Prior to a bread-baking test using the obtained composition, a cylinder fermentation test was carried out with addition of a wheat flour suspension treated with an yeast autolysate in order to examine the function of the wheat flour suspension in dough development. The cylinder fermentation test is a test in which the dough development is measured as to a dough, in which the dough is prepared by means of sponge dough process and fermented at 30° C. in a cylinder.

Cylinder fermentation test was also carried out for a comparison with addition of an oxidizing agent and a reducing agent instead of using the autolysate samples and the wheat flour suspension since it is generally known that an oxidizing agent and a reducing agent are very important in baking breads. As typical oxidizing agents and reducing agents, potassium periodate and sodium hydrosulfite were employed respectively.

| Formula | |
|---|---|
| Wheat flour (hard flour) | 70 g |
| yeast food | 0.1 g |
| succinic acid-monogliseride | 0.2 g |

| Formula | |
|---|---|
| baker's yeast (compressed yeast) | 2.4 g |
| water | 44 ml |
| *additive | |
| *(1) yeast autolysate | 0.7% |
| (2) yeast autolysate and 1 g/dl flour | 0.7% |
| (3) potassium periodate | 20 ppm |
| (4) sodium hydrosulfite | 40 ppm |
| (5) (control) | |

Figure 2:
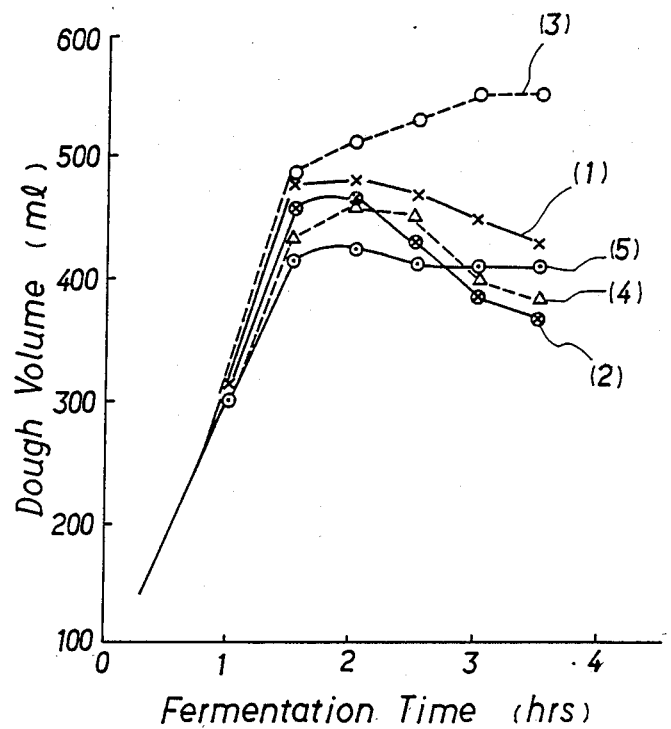
FIG. 2 is a graph showing a dough development when a dough is prepared by means of sponge dough process with addition of an oxidizing agent, a reducing agent, yeast autolysate, or yeast autolysate and a wheat flour and fermented at 30° C. in a cylinder.

Materials are mixed by Hobart Mixer for 3 minutes at a low speed and 2 minutes at a medium speed to give a dough. The dough was put into a cylinder and fermented at 30° C. The dough volume was recorded with the passage of time. The results are shown in FIG. 2.

From FIG. 2, it is presumed that by addition of an oxidazing agent, the dough development is accelerated and the elasticity of dough, which is necessary for retening the gas in a dough, is improved since the developed dough volume is maintained even at a later period of the test.

On the other hand, when a reducing agent was added as an additive, though the dough development was accelerated at an early period of the test, it is presumed that gas leakage due to the weaken dough occurs since the dough tends to be broken down at a later period of the test.

Though the above explanation about the result of cylinder fermentation test is not backed by an established theory, it is presumed that the test result is useful as an indicator of an oxidizing activity or reducing activity for a dough.

In order to check these phenomena a control of water addition depending on the moisture content of the wheat flour is necessary.

In comparison with the result when a reducing agent or an oxidizing agent was added, when the wheat flour suspension was added, there was observed a tendency that the reducing power was increased with the increase of the adding amount of a wheat flour to the autolysate.

There was not observed any difference between GSH amounts measured by means of Alloxan method, as to the dough with only the autolysate and the dough with the wheat flour suspension, comprising autolysate and flour. Therefore, it is presumed that in the dough with the autolysate and the suspension, other reducing substrances other than GSH are included.

EXAMPLE 5

Figure 3:
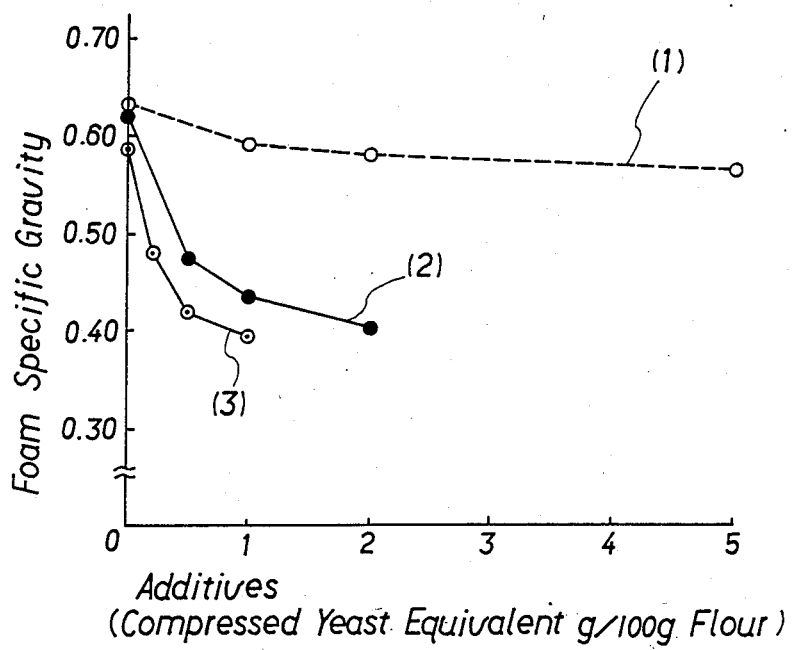
FIG. 3 is a graph showing a foam specific gravity of a wheat flour suspension in which baker's yeast (compressed yeast), yeast autolysate, or baker's yeast and yeast autolysate was incubated.

It was suggested in Example 4 that surface-active substances were formed by the action of both the disrupted yeast cells suspension and the yeast cells to the wheat flour. In order to examine the activity, the level of foaming quality of the treated wheat flour suspension was evaluated according to the method reported by Ohta et al. [cf. Ohta, S., Inoue, S., and Torigoe, T., Cereal Foods World 28: 561 (1983)]. A wheat flour (hard flour) was suspended in water to give a suspension including 10.0% (dry weight per the suspension) of a weight flour. Baker's yeast autolysate was added together with the yeast cells to the wheat flour suspension, and incubated with stirring at 30° C. for 2 hours under periodical pH adjustment at 5.5. The treated wheat flour suspension was chilled down to 5° C., and 100 g of sucrose and 0.7 ml of soybean oil were added to 100 ml of the wheat flour suspension. The foaming of the suspension was conducted for 7 min at 5° C. using Hobart Mixer, and the specific gravity of the foam was measured. The results are shown in FIG. 3. It was shown in FIG. 3 that the activity of foaming of the wheat flour suspension was greatly improved by the action of the disrupted yeast cells suspension. The results clearly suggested the formation of surface active substances by the action of the yeast autolysates to the wheat flour, most possibly to gluten protein.

Example 6

Using the compositon prepared in Example 4, a white bread-baking test by means of straight dough process was carried out.

| Basic formulation | |
|---|---|
| wheat flour (hard flour) | 100 parts |
| sugar | 5 parts |
| salt | 2 parts |
| baker's yeast (compressed) | 2.2 parts |
| yeast food | 0.1 part |
| non-fat dry milk | 2 parts |
| the composition* (after 1 week preservation in a refrigerator) | 6 parts |
| water | 68 parts |

*the composition
(1) pure water as aqueous phase (control)
(2) yeast autolysate as aqueous phase
(3) 2g/dl of wheat flour and yeast autolysate as aqueous phase
(4) 5g/dl of wheat flour and yeast autolysate as aqueous phase After mixing the materials, except for the composition, for 1 minute at a low speed, 1 minute at a medium speed and then 5 minutes at a high speed, the composition was added thereto and the mixture was further mixed for 1 minute at a low speed, 1 minute at a medium speed and then 5 minutes at a high speed. The temperature of the mixture was adjusted 26° to 27° C. during the mixing.

After 1 hour fermentation at 30° C., the dough was punched, and then divided. And after 25 minutes bench time, the obtained dough was passed through a moulder and then to panning, followed by proofing in a final proofer at 38° C. and at 85% humidity. The proofing time shown in Table 1 is a time for which the dough volume reaches a predetermined volume (1.5 cm above a pan). The tolerance to mechanical treatment was evaluated by observing the dough state at the time of dividing the dough and the time of shaping the dough by a moulder. A sensory evaluation was carried out as to the colour and nature of crust, grain of crum, aroma and taste by five specialists. The results are shown in Table 1.

TABLE 1

| Items of evaluation | The composition | | | |
|---|---|---|---|---|
| | (1) | (2) | (3) | (4) |
| Proofing time (min) | 54 | 52 | 50 | 50 |
| Specific volume of the bread (ml/g) | 4.70 | 4.80 | 4.90 | 5.00 |
| Mechanical tolerance* | 2–3 | 3–4 | 4 | 4 |
| Colour and nature of crust* | 3 | 4 | 4 | 4 |
| Grain of crum* | 3 | 3 | 4 | 5 |
| Aroma* | 2 | 3 | 4 | 4 |
| Taste* | 2 | 2–3 | 3 | 3 |

*Numbers in the columns shows:
5: Excellent
4: Good
3: Moderate
2: Inferior

It would be understood from Table 1 that the grain of crum and the colour and nature of crust of dough were improved as well as the tolerance against the mechanical treatment of the dough by using the composition of the present invention.

Using an corresponding amount of the yeast autolysate which had been preserved in a refrigerator for 1 week in the state of liquid, the bread-baking test was carried out. There was hardly obserbed any effect, which was in accord with the loss of a reducing power during the reservation as shown in Example 1.

A composition containing an aqueous phase, wherein yeast cells were treated with a wheat flour, showed a particularly excellent effect.

The addition of the treated wheat flour to the aqueouses phase in the fat conposition was effective also for the preservation of the dough improvers activity.

Generally, when a fat composition is kneaded into a dough, it is necessary to add an emulsifier. On the other hand, in using the composition of the present invention, any emulsifier is not necessary. Therefore, it is presumed that the composition has an excellent emulsifying function for uniformly dispersing itself in dough.

EXAMPLE 7

Using the composition prepared in Example 4, a hard-biscuit baking test was carried out.

In producing biscuits by machinery, the extensibility of a dough is an important condition and the dough properies affect the shape and size of baked products. Therefore, in producing biscuits, some steps to improve the extensibility of dough are taken, e.g. addition of a reducing agent such as $Na_2S_2O_4$ or protease, and the like. Here, the effect of addition of the composition was examined.

| Basic formulation | |
| --- | --- |
| wheat flour (soft flour) | 600 g |
| shortening | 10 g |
| *the composition | 60 g |
| granulated sugar | 80 g |
| glucose | 40 g |
| non-fat dry milk | 12 g |
| ammonium carbonate | 6 g |
| sodium hydrogencarbonate | 2 g |
| salt | 5 g |
| water | 180 ml |

*the composition
(1) pure water as aqueous phase (control)
(2) yeast autolysate as aqueous phase
(3) 2 g/dl of wheat flour and yeast autolysate as aqueous phase To a sirup of 75° C., made of granulated sugar, shortening, the composition, salt and 140 ml of water, was added a mixture of wheat flour and non-fat dry milk, and kneaded for 2 minutes at a low speed. After adding a mixture in which ammonium carbonate and sodium hydrogencarbonate were dissolved in 40 ml of water, the obtained mixture was kneaded for 4 minutes at a low speed at a temperature of 38° to 39° C. The obtained dough was wrapped in a towel, allowed to stand for 20 minutes at about 30° C., subjected to a laminator, and rolled three times. The dough was cutted by a stamping machine, and baked in an oven for 8 minutes at 200° C.

The extensibility of dough, the size of biscuits and the flavor of biscuits were evaluated. The extensibility was evaluated by the specialist's observation of the dough during the process and the Extensograph (Bravender unit) results. The size of biscuits was evaluated as a total diameter of 10 natural-cooled biscuits. And the flavor was evaluated by 3 specialists.

The results are shown in Table 2.

TABLE 2

| The composition | Extensibility of dough | Size of biscuits (cm) | Flavor |
| --- | --- | --- | --- |
| (1) | inferior | 54.5 | moderate |
| (2) | improved | 55.0 | moderate |
| (3) | good | 55.6 | good |
| (4) addition of $Na_2S_2O_4$ (50 ppm) | good | 55.0 | moderate |

It would be understood from Table 2 that the composition in which an yeast autolysate was treated with a wheat flour improved the extensibility of dough. The composition was as effective as or more effective than sodium hydrosulfite ($Na_2S_2O_4$), which is regarded as one of the most effective dough improvers for a baked confectionery.

Using an yeast autolysate preserved in a refrigerator for 10 days, a biscuit-baking test was carried out in the same manner as above. There was recognized no effect, which was in accord with the loss of the reducing power as shown in FIG. 1.

EXAMPLE 8

A suspension, in which 4 g of wheat flour (hard flour) and 0.5 g of non-fat dry milk per 100 ml of the suspension were added to the baker's yeast (compressed yeast) suspension, was prepared in Example 4. To the suspension was added a mixture of *Lactobacillus bulgaricus* (IFO-3533) and *Streptococus thermophilus* (IFO-3535) in a ratio of 1:1 as lactic acid bacteria at a concentration of $10^8$/ml. The suspension was stirred for 4 hours at 30° C. in a pH range of 4.5 to 5.5 for incubation. After the temperature was elevated to 37° C., 5 ml of ethyl acetate per 100 ml of the suspension was added thereto, and the mixture was stirred for 2 hours to proceed the autolysis of yeast. Then, the composition was prepared according to the process in Example 1.

Using the obtained composition, a bread-baking test was carried out by means of sponge dough process. There are generally known a method, in which pottasium bromate is employed as yeast food, and a method in which ascorbic acid is employed as yeast food. In case ascorbic acid is employed, there occur a poor tolerance to mechanical tolerance of dough, an insufficient volume of bread caused by caving and the like, a deterioration of flavor of bread and the like. There are various reports as to the means for the improvement of these defects.

So, the test was carried out with employing an yeast food in which ascorbic acid is included, and the result was compared with that using the pottasium bromate as an yeast food to show the effect of the composition of the present invention.

| Formula for sponge | |
| --- | --- |
| wheat flour (hard flour) | 70 parts |
| water | 41 parts |
| baker's yeast | 2 parts |
| *yeast food | 0.1 part |

*yeast food
(1) ascorbic acid (20 ppm)
(2) ascorbic acid (20 ppm) (control I)
(3) pottasium bromate (10 ppm) (control II)

-continued

| Formula for Dough | |
|---|---|
| wheat flour (hard flour) | 30 parts |
| sugar | 5 parts |
| salt | 2 parts |
| non-fat dry milk | 2 parts |
| *fat composition | 6 parts |
| water | 25 parts |

*fat composition
(1) the composition of the present invention with yeast autolysate as aqueous phase
(2) margarine with water (control I)
(3) margarine with water (control II)

The materials for sponge were mixed and the mixture was kneaded for 3 minutes at a low speed, and for 2 minutes at a medium speed. The dough temperature after kneading was 23° to 24° C. The sponge dough fermentation was carried out for 4.5 hours at 27° to 28° C.

To the sponge were added the materials for dough. The kneading was carried out for 2 minutes at a low speed, for 2 minutes at a medium speed and for 3 minutes at a high speed. And thereto was added the composition and the kneading was further carried out for 2 minutes at a low speed, for 2 minutes at a medium speed, and 3 minute at a high speed.

After 15 minutes of floor time, the dough was divided. And after 20 minutes bench time, the dough was shaped by a moulder, panned and finally proofed at 85% humidity until the dough volume reached a predetermined volume. Then, the dough was baked for 35 minutes at 210° C. The tolerance to mechanical treatment of the dough, oven kick and volume, colour and nature of crust, grain of crum, aroma and taste of the bread was evaluated by 5 specialists.

TABLE 3

| | (1) | (2) Control I | (3) Control II |
|---|---|---|---|
| Tolerance to mechanical treatment* | 4 | 2 | 3 |
| Final proofing time | 57 min | 58 min | 56 min |
| Specific volume of the bread | 5.05 | 4.60 | 4.90 |
| Oven kick and volume* | 4 | 2 (caving) | 4 |
| Colour and nature of crust* | 4 | 3 | 4 |
| Grain of crum* | 4 | 3 | 4 |
| Aroma* | 4 | 3 | 3-4 |
| Taste* | 4 | 2 | 3 |

*The numbers in the columns shows:
4:Good
3:Moderate
2:Inferior

As shown in Table 3, by using the composition of the present invention, the tolerance to mechanical treatment was improved, the caving was minor, and the specific volume was as good as one using pottasium bromate as an yeast food.

It is noteworthy that the dough property and the aroma and taste of the bread were improved by using lactic acid bacteria.

EXAMPLE 9

Using the suspension in which 2 g/dl of a wheat flour was added to an yeast cells suspension and, after incubation, the yeast cells were autolyzed, a composition in the form of powder was prepared.

To a mixture of 100 ml of water and 20 ml of yeast autolysate were added 8 g of sodium caseinate, 0.1 g of sodium citrate, 7 g of non-fat dry milk, 0.2 g of carboxy methyl cellulose, and the mixture was heated to 60° C. and stirred. And thereto 2 g of monoglyceride (a mixture of oleic acid monoglyceride and stearic acid monoglyceride in a ratio of 7:3 by weight) as an emulsifier, 80 g of hydrogenated cotton seed oil (m.p. 39° C.) as a fat. The mixture was homogenized by a homomixer to give an emulsion (temperature: about 50° C.). The obtained emulsion was spray-dried to give a composition in the form of powder.

Using the obtained composition, a bread-baking test was carried out in the same manner as in Example 6.

The specific volume of bread baked with using the composition was 4.85. On the other hand, the specific volume of bread baked with using a conventional composition in the form of powder was 4.50.

The elasticity of dough and quality of the bread with the composition of the present invention were excellent in comparison with the conventional composition.

Further, even after 2 weeks preservation at a temperature of 20° to 30° C., the composition of the present invention showed the equal effect with the composition not preserved, and thus an excellent preservation stability was confirmed.

What we claim is:

1. A fat composition suitable for use in bakery or in confectionery, comprising
    (a) an aqueous phase containing a wheat flour suspension treated with either a disrupted yeast cells suspension or a mixture of a disrupted yeast cells suspension and an yeast.
    (b) a fat component and
    (c) an emulsifier.

2. The composition according to claim 1, which contains 1 to 50 parts by weight of said aqueous phase, 50 to 99 parts by weight of said fat component and 0.1 to 5.0 parts by weight of said emulsifier, the total thereof being 100 parts by weight.

3. The composition according to claim 1, wherein said yeast is a member selected from the group consisting of an yeast belonging to a genus of Saccharomyces, Kluyveromyces and Candida.

4. The composition according to claim 3, wherein said yeast belonging to Saccharomyces genus is baker's yeast or brewery's yeast.

5. The composition according to claim 1, wherein said fat component is a member selected from the group consisting of an animal or vegetable fat, a hydrogenated fat thereof, a fractionated fat thereof and an interesterified fat thereof.

6. The composition according to claim 5, wherein said animal or vegetable fat is a member selected from the group consisting of soybean oil, cotton seed oil, rapeseed oil, palm oil, coconut oil, corn oil, palm karnel oil, Iojoba oil, cuphea oil, fish oil, beef tallow and cream.

7. The composition according to claim 1, wherein said aqueous phase contains an assistant which is a member selected from the group consisting of a natural reducing agent, a protease and an organic acid.

8. The composition according to claim 7, wherein said natural reducing agent is a member selected from the group consisting of glutathione, cysteine and ascorbic acid.

9. The composition according to claim 8, wherein said organic acid is a member selected from the group consisting of fumaric acid, succinic acid, tartaric acid, citric acid, lactic acid, malic acid, acetic acid and propionic acid.

10. The composition according to claim 1, wherein said fat component has a melting point of 20° to 45° C.

11. A fat composition in the form of powder, which is obtained by drying an fat composition comprising
(a) an aqueous phase containing a wheat flour suspension treated with either a disrupted yeast cells suspension or a mixture of a disrupted yeast cells suspension and an yeast,
(b) a fat component and
(c) an emulsifier, wherein said aqueous phase contains additives which serve as a coating or stabilizing agent, said additives being a member selected from the group consisting of a protein or protein-containing material and a carbohydrate.

12. The composition according to claim 11, wherein said protein or protein-containing material is a member selected from the group consisting of wheat protein, non-fat dry milk, soy protein and gelatin.

13. The composition according to claim 11, wherein said carbohydrate is a member selected from the group consisting of starch or derivative thereof, maltose and lactose.

14. The composition according to claim 11, wherein said gum is a member selected from the group consisting of gum arabic, quar gum, carrageenan, xanthan gum and cellurose derivatives.

15. The composition according to claim 11, wherein the carbohydrate is a gum.

16. The composition according to claim 11, wherein the protein is casein.

17. A process for preparing a fat composition, which comprises reacting an yeast cells suspension with a wheat flour to give an aqueous phase containing a wheat flour suspension treated with either a disrupted yeast cells suspension or a mixture of a disrupted yeast cells suspension and an yeast, emulsifying said aqueous phase into a fat component by mixing and stirring together with an emulsifier to form a preliminary emulsion, rapidly chilling and kneading said preliminary emulsion for plasticization.

18. The process according to claim 17, wherein an additive which serves as a coating or stabilizing agent is added to said aqueous phase, said additive being a member selected from the group consisting of a protein or protein-containing material, a carbohydrate and a gum.

* * * * *